United States Patent [19]

Rao et al.

[11] 4,125,528

[45] Nov. 14, 1978

[54] METHOD FOR FRACTIONATING THE WHOLE WHEAT KERNEL BY CENTRIFUGAL MEANS

[75] Inventors: Ganta V. Rao; Floyd K. Shoup, both of Hutchinson, Kans.

[73] Assignee: Far-Mar-Co, Inc., Hutchinson, Kans.

[21] Appl. No.: 831,973

[22] Filed: Sep. 9, 1977

[51] Int. Cl.$^2$ .............................................. A23J 1/12
[52] U.S. Cl. .................................. 260/112 G; 127/67; 127/69; 426/436; 426/479; 426/484; 426/518
[58] Field of Search .................................. 260/112 G

[56] References Cited

U.S. PATENT DOCUMENTS

| | | | |
|---|---|---|---|
| 2,504,962 | 4/1950 | Burdick | 260/112 G X |
| 3,788,861 | 1/1974 | Durst | 426/385 |
| 3,790,553 | 2/1974 | Rao et al. | 260/112 G |
| 3,851,085 | 11/1974 | Rodgers et al. | 260/112 G X |
| 3,891,613 | 6/1975 | Rao et al. | 260/112 G |
| 3,951,938 | 4/1976 | Kerkonnen et al. | 260/112 G |
| 3,979,375 | 9/1976 | Rao et al. | 260/112 G |

Primary Examiner—Howard E. Schain
Attorney, Agent, or Firm—Sixbey, Friedman & Leedom

[57] ABSTRACT

A process for fractionating the whole wheat kernel into its gluten, starch and bran-germ components including the steps of tempering the whole wheat kernel in water to increase its moisture content, milling the tempered kernel to reduce the particle sizes of the kernel components, forming a homogeneous slurry of the particles and water, the wheat to water ratio of the slurry being in the range 1:3 to 1:10, by weight, vigorously admixing the slurry to achieve uniform dispersion of the particles in the water, applying centrifugal forces to the slurry to cause it to separate into its gluten, starch and water phases, separating the gluten and starch phases and purifying them by conventional techniques to recover gluten, starch and bran-germ in very high yield fractions.

17 Claims, 1 Drawing Figure

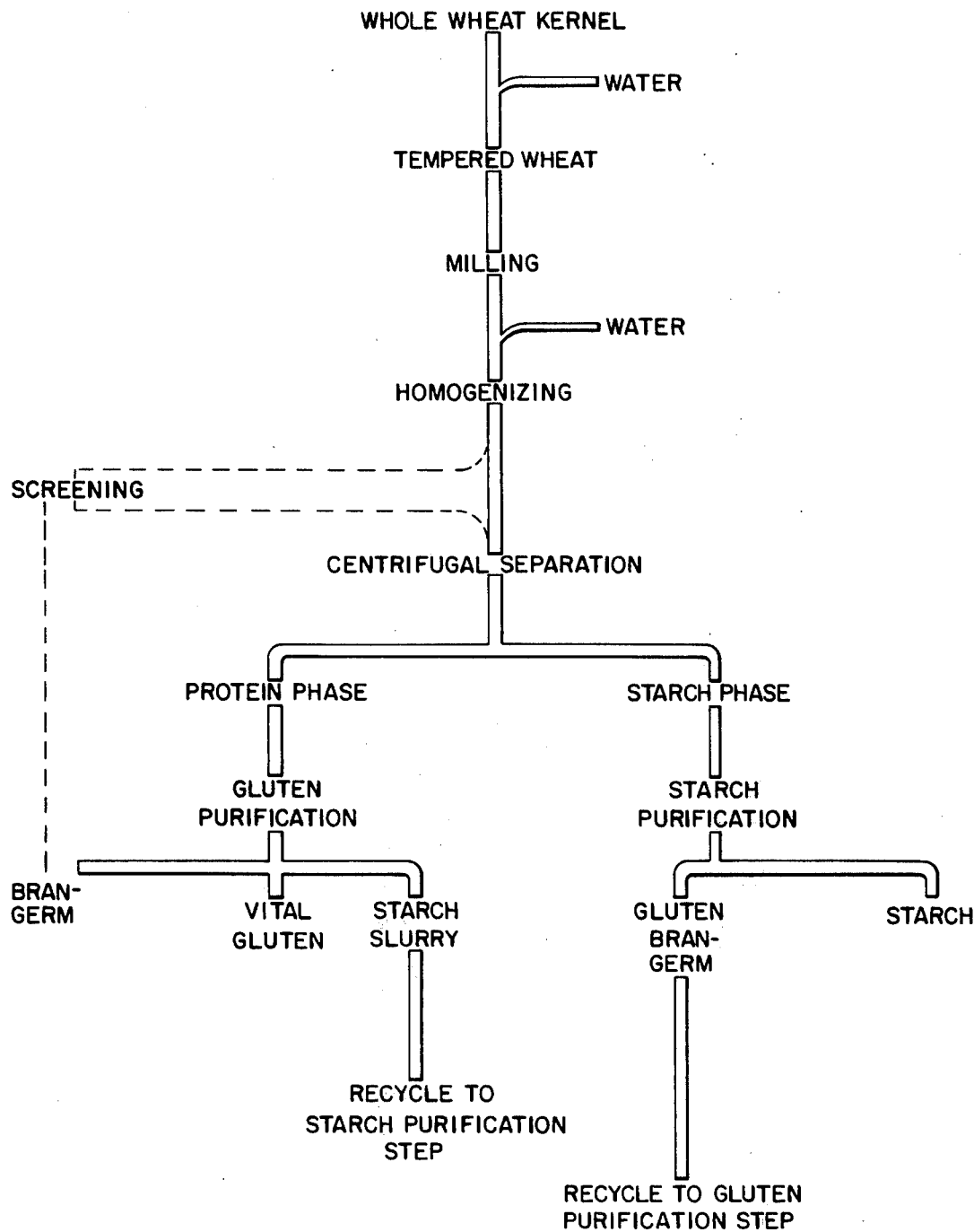

METHOD FOR FRACTIONATING THE WHOLE WHEAT KERNEL BY CENTRIFUGAL MEANS

BACKGROUND OF THE INVENTION

1. Field of the Invention

The present invention relates to the separation of vital wheat gluten and starch and, more particularly, to a wet process for fractionating vital wheat gluten, starch, and bran-germ from the whole wheat kernel with minimum damage to the frictional, chemical and biological characteristics of the wheat kernel components.

2. Description of the Prior Art

The commercial production of vital wheat gluten and the separation of starch therefrom has been accomplished in the past using wheat flour or second clears (a small fraction of the flour stream) as the starting material by the "dough ball" process and modifications thereof, which processes essentially separate the wheat starch from the gluten protein. In one process, the gluten is maintained as a single coherent mass and the starch is washed out of a flour and water dough. Another process disperses the dough in water and the recovers the gluten particles on a screen. Variations of the basic dough ball process utilizing wheat flour account for a major part of the vital gluten produced commercially today. Until recently, no known gluten production process employed the whole wheat kernel as the starting material. This way probably because production of vital wheat gluten is a comparatively recent innovation which developed from starch recovery processes. Early starch recovery processes utilized the whole wheat kernel but could not be converted to gluten production because the process conditions were too harsh and destroyed or devitalized the gluten. On the other hand, dough ball or batter processing from wheat flour was relatively simple because the bran and the germ had been substantially removed in the milling process. In addition, high ash second clears worked well in the dough ball process and were available at attractive prices as a by-product of the flour milling industry. Consequently, wheat gluten processing had been flour oriented for decades and no need had apparently existed to motivate the development of a process starting from the whole wheat kernel. However, improvements in milling techniques coupled with a drastic decline in the number of operative flour mills has led to current shortages of and higher prices for clears. As a result, millions of pounds of vital wheat gluten are imported by the United States each year to meet demands domestic producers cannot fill.

Processes for vital wheat gluten-starch separation and gluten recovery which utilize the whole wheat kernel as the starting material are taught in U.S. Pat. No. 3,891,613 and U.S. Pat. No. 3,979,375. According to these processes the whole wheat kernel is tempered in water and impact milled or flaked. The resulting particles or flakes are thereafter hydrated to saturation to form a thick, dough-like mass and are mechanically worked in the presence of water to wash the wheat kernel components from the gluten. Complete dough hydration as a preliminary to fractionating, as taught in these patents, has always been considered an essential element in the effective separation and recovery of high quality wheat components in high yields.

Recently, it has been suggested that fractionation can be accomplished without need to first form a hydrated dough. In U.S. Pat. No. 3,951,938 the well known Fesca process for starch/gluten separation has been supplemented by a protein purification process to permit the recovery of a vital gluten fraction containing at least 80% protein on a dry basis. This patent, which uses wheat flour (not the whole wheat kernel) as the starting material, discloses mixing one part wheat flour with 1.2-2.0 parts water to form a suspension of flour in water, homogenizing the suspension by agitation in a pin mill, centrifuging the homogenized suspension to separate a heavy starch fraction from a light protein fraction, maintaining the protein fraction in a quiescent state for a time sufficient for the gluten therein to begin to hydrate and to begin to agglomerate into thread-like gluten formations, diluting the protein fraction with at least an equal amount of water, agitating the diluted fraction in a pin mill to completely hydrate and agglomerate the gluten and filtering the gluten agglomerates from the balance of the protein fraction. It has been found, however, that the starch and protein fractions recovered by this process do not evidence the very high quality or purity of the fractions recovered from hydrated dough processing and specifically from processes such as those taught in U.S. Pat. Nos. 3,891,613 and 3,979,375. The recovered starch fraction contains unseparated protein as an undesirable impurity and the gluten fraction contains unseparated starch as an undesirable impurity. Moreover, the recovered gluten product, although high in protein content, is not as high in vitality as gluten recovered from the hydrated dough fractionation processes of U.S. Pat. Nos. 3,891,613 and 3,979,375. This is probably due to the high shear forces employed during purification of the gluten using a pin mill. Finally, the process of U.S. Pat. No. 3,951,938 would be largely ineffective using the whole wheat kernel as a starting material since it provides no means for dealing with the bran-germ particles which would contaminate the protein fraction and interfere with gluten agglomeration.

SUMMARY OF THE INVENTION

It is, therefore, an object of the present invention to provide a method for separating and recovering highly vital wheat gluten from the whole wheat kernel without the need to first form a thick, hydrated dough.

It is another object of the invention to provide a whole wheat kernel fractionation process which can separate and recover high quality starch and bran-germ, as well as gluten, fractions.

It is another object of the invention to provide a method for separating and recovering starch, gluten and bran-germ from the whole wheat kernel by the application of centrifugal forces.

Other objects and advantages will become apparent from the following description and appended claims.

Briefly stated, in accordance with the aforesaid objects, the present invention provides a process for fractionating the whole wheat kernel, and, particularly, for separating wheat gluten from the starch component of the whole wheat kernel with minimum damage to the physical, chemical and biological properties of the kernel components. According to the process, as can be seen in the accompanying Figure, the whole wheat kernel is tempered in water and then milled, e.g., flake milled, pin milled, flake milled followed by flake disintegration, to reduce the particle sizes of the kernel components. The milled particles are admixed with water to form a relatively thin homogeneous slurry, e.g., at least 3:1 water to wheat, by weight, in which there is uniform dispersion of the solid particles in the liquid and maximum dissociation of the starch and gluten matrix. The dispersion is separated into its gluten, starch and water phases by application of centrifugal forces thereto, e.g., by centrifugation, and the gluten phase is further processed by conventional techniques to remove any remaining wheat kernel component impurities therefrom. The resulting gluten is vital, undenatured and has a protein content of about 80% by weight on a dry basis.

BRIEF DESCRIPTION OF THE DRAWINGS

The invention will be better understood from the following description taken in conjunction with the accompanying FIGURE which is a block flow diagram of a preferred form of the present process.

DETAILED DESCRIPTION OF THE INVENTION

The present invention is directed primarily to fractionation of the whole wheat kernel into its major components and, particularly, to the separation of vital wheat gluten therefrom instead of from wheat flour, as is presently the predominant practice. It will be appreciated, however, that a process which can fractionate the whole wheat kernel can also utilize, if desired, wheat flour as the starting material. Inasmuch as wheat flour already has the bran and germ removed it is far more difficult to fractionate the whole wheat kernel to recover the components thereof than to fractionate wheat flour alone. Aside from considerations of availability, there are a number of distinct advantages incident to starting from the whole wheat kernel. Essentially all of the gluten in the wheat is recoverable from the whole wheat kernel, while processing of wheat flour, by its nature, can recover only the gluten in the by-product clears. Moreover, the whole wheat kernel offers a stable supply of raw material with dependable and predictable physical and chemical characteristics. On the other hand, wheat flour is a by-product of differing milling techniques and is neither a uniform nor a stable raw material. In addition, processing the whole wheat kernel produces a greater yield of high quality gluten per bushel of wheat processed.

The first step of the present process comprises tempering the whole wheat kernel in water with intermittent mixing to achieve a kernel moisture content in the range, by weight, from about 14% to saturation. Unprocessed whole wheat kernels have a moisture content generally in the range from about 11.2 to 14%. The resaturation moisture content depends upon the characteristics of the kernel and, at room temperature, is generally in the range from about 45 to 55% by weight. Tempering in accordance with the present process involves contacting with or immersing the kernels in water for a period of time sufficient to allow the kernels to takeup the necessary water to reach the desired moisture content. In one form, the kernels are contacted with water and mixed and then moved to a tempering tank where they remain in contact with the tempering water for a time sufficient for them to reach the desired moisture content. It is preferred, although not required, to temper the kernels in precisely the amount of water necessary to reach the desired water content. This avoids loss of water soluble protein to the tempering water. Tempering is a relatively slow process, it having been found, for example, that contacting the kernels with water at room temperature, i.e. about 68° F., requires about 2-12 hours, usually about 8 hours, to reach an optimum moisture content. However, the tempering rate can be increased by heating. If the tempering solution is heated, care must be exercised to maintain the temperature below a value where the gluten may become damaged. Indeed, since an object of the process is to produce vital wheat gluten as a most important whole wheat kernel fraction, each step of the process should be conducted below the temperature at which the gluten may become damaged. Gluten damage will occur at about 140° F., or, after prolonged heating, at temperatures above 120° F. Therefore, tempering is most advantageously conducted in the temperature range from room temperature up to about 120° F.

Tempering is preferably employed in one embodiment of the present process to increase the moisture content of the kernel to no more than about 22% water by weight, although tempering to about 14-18% moisture has been found to be optimum in terms of minimizing starch damage and maximizing endosperm yields following milling. If the moisture content of the kernel is increased beyond 22% by weight at this early stage of the processing, the possibility of microbial growth is substantially enhanced. Accordingly, tempering to the range 15-17% is particularly advantageous.

Increasing the whole wheat kernel moisture content to at least about 14% is necessary as a preliminary to milling in processes wherein it is desired to start with the whole wheat kernel and to separate and recover each of the starch, gluten and bran-germ components therefrom. Unless the kernel moisture content is at least 14% prior to milling the germ and starch will be damaged during particle size reduction. Moreover, the present process is fundamentally a whole wheat kernel component fractionation process. As such, it is particularly desirable to maintain the bran as intact as possible, i.e. to avoid shattering the bran, since in subsequent steps the bran-germ particles will be separated from the endosperm components of the whole wheat kernel. Moisture content increase to at least 14% ensures that the bran remains reasonably plastic and therefore is ground to a lesser degree than the endosperm during milling.

One method of milling the tempered whole wheat kernel to achieve particle size reduction is by flaking. Flaking may be accomplished in a conventional roller mill having clearances from 0.001 to 0.05 inch. While the ultimate particle size resulting from the flaking is immaterial, it has been found that flakes having thicknesses from 0.0005 to 0.025 inches may be satisfactorily processed in accordance with the present process. Flaking is a well known processing step and, as used herein, contemplates processing in commercially available equipment, such as roller mills, under conditions known to be conductive to flaking. It has been found that the use of smooth rolls, rather than corrugated or fluted rolls, is most desirable from the standpoint of flake thickness and minimizing starch damage. Flaking is preferable to many other forms of particle size reduction, such as grinding in a hammer mill, because it has been found to be extremely difficult, as a practical matter, to subsequently remove the bran from the extremely small particles of ground wheat.

Another method of accomplishing particle size reduction of the tempered whole wheat kernel is in a pin mill. Pin (impact) milling has been found to increase free endosperm yields compared to roller or flake milling with less damage to the starch component of the endosperm. Pin or impact mills are well known items of processing equipment and are generally commercially available. For example, pin mills suitable for use in the present process are available from Alpine American Corp. of Natick, Mass. under the registered trademarks Kolloplex and Contraplex. As is generally well known, a typical pin mill has two pinned discs with four circular rows of pins on each disc. One of the discs is stationary and the other rotates at high speed. Grinding is accomplished by percussion and impact action through an intermeshing of the pins on the two discs. The sample to be ground is fed into the mill at the center of the stationary disc. The inner row of pins has lower lineal velocities relative to the outer row of pins. The easy to grind material is ground by the slower pins while the harder to grind material requires higher velocities and is ground by the outer rows of faster pins.

During grinding in a pin mill, the brittle endosperm is crushed into flour-like particles (i.e. 5–10 microns in diameter) while the more plastic bran is ground to a lesser degree. Maximum endosperm yields with minimum damage to starch, gluten, and bran-germ can be achieved by operating the pin mill at about medium speed, i.e. in the range 11,000–20,000 rpm and preferably about 17,000 rpm.

Another desirable technique for particle size reduction of the tempered whole wheat kernel is a two stage milling procedure whereby the kernel is flaked and, thereafter, the flakes are disintegrated using a hammer, pin or other type mill. This two stage technique appears to be quite useful, particularly where it is controlled such that the flakes are disintegrated to a particle size range whereby about 25–75%, preferably 40–60%, and most desirably about 50% thereof are retained on a 50 mesh screen. Unless otherwise stated, screen sizes referred to throughout correspond to screen size designations of W. S. Taylor Inc. of Mentor, Ohio.

Following particle size reduction, the particles of the whole wheat kernel are admixed with water to form a homogeneous, relatively thin slurry, i.e., a uniform dispersion of the solid particles in water. This can be accomplished by utilizing a wheat to water ratio, by weight, in the range 1:3 or more, generally 1:3 to 1:10, and preferably 1:5. The use of excess water beyond the 1:10 ratio does not adversely affect the slurrying process, but is uneconomical in terms of the additional water used and the subsequent need to remove water from the finished product, e.g., by concentration or drying. A homogeneous dispersion is achieved using a conventional homogenizer or high speed mixer to vigorously agitate the admixture to obtain maximum dissociation of the starch and gluten endosperm matrix. The use of water in an amount equal to at least three times the quantity of wheat particles is essential to achieve the extent of dissociation and dispersion requisite for efficient fractionation and maximization of starch, gluten and bran-germ yields. Also of importance is the extent of agitation to achieve the desired dispersion. Notwithstanding that sufficient water is employed to achieve adequate dilution, if the agitation in the homogenizer is inadequate then, instead of dissociation and dispersion, the result is hydration and agglomeration of the gluten and the formation of doughy lumps. This is undesirable since the effect of agglomeration is to incorporate the starch particles into the gluten agglomerates to form the same sort of hydrated doughy masses that the prior art had confronted and which it is an object of this process to avoid. Therefore, it is essential that agitation be vigorous enough in terms of rpm and time to dissociate the starch and gluten and to disperse the particles. Generally, high speed homogenization for short times is preferred, with the specific speeds and times dependent on the particular equipment used. By way of example, it has been found that a conventional high speed blender, such as a Waring blender, can be suitably operated at 10,000–20,000 rpm for less than 5 minutes and generally for less than 3 minutes. As a general matter it is undesirable to agitate at speeds or for times greater than necessary to achieve homogeneity, dissociation and dispersion since the creation of too much shear may cause further reduction in bran or germ particle size.

It is possible, although not necessary, at this point in the process to effect an initial separation of brangerm particles from the starch and gluten components of the wheat kernel. In fact, it is preferred that the bran-germ not be removed since it is likely that some gluten will be removed from the slurry and likely lost from the system at the same time. However, if the bran-germ is not removed at this time, it may prove difficult to subsequently recover, particularly in the absence of gluten washing equipment specifically designed to separate and recover bran-germ. Brangerm separation is advantageously accomplished by passing the homogenized slurry through a conventional screening operation whereby a large proportion of the bran-germ particles are retained on the screens while the smaller endosperm particles in the slurry pass through the screens. Note that this screening step is shown in phantom in the accompanying Figure to indicate its optional nature. Generally, screens having mesh sizes in the range 20 to 50 are suitable for the screening operation, it being understood that the actual screen sizes used in any operation will depend in large part upon the extent to which kernel tempering was carried out and the manner in which the kernel particles were milled. Although any well known screen configuration and type may be employed, the use of the vibrating and/or oscillating screens, of the flat or convex type, is preferred. The bran-germ particles retained on the screens may be washed with water and then further processed, e.g., cooked or dried, packaged and/or used.

The homogeneous slurry, following screening if bran-germ separation is effected, is processed to separate and recover the vital wheat gluten and starch components therefrom. The preferred manner of effecting the separation is to apply centrifugal forces to the slurry to separate the slurry into three distinct phases: a relatively heavy solid starch phase; a water phase; and a relatively light solid protein phase. The centrifugal forces applied to the slurry should be controlled since if the force is too small, very little or no phase separation occurs. If the applied forces are too high, both the starch and protein solid phases will diffuse together through the water carrier and the only separation which will result will be two phase, i.e., a solids phase comprising starch and gluten and a liquid water phase. Operation of centrifugal equipment to acheive three phase separation is well within the skill of the art and, with some trial and error, the optimum force application for any wheat to water ratio in the slurry can readily be determined. Any conventional equipment may be used to subject the slurry to centrifugal force, e.g., decanting centrifuges, cylones, etc. Although the specific rpm and the like at which such equipment is operated is a function of the piece of equipment, it has generally been found that the applied centrifugal force should be in the range 25G–75G, preferably 50G, wherein G represents the force of gravity.

It has been determined that in addition to operation of the centrifugal equipment at proper G forces, a most important contributor to effective phase separation is the extent of homogeneity attained in the slurry. The latter is, as has previously been indicated, primarily a function of dilution and agitation but also a function of slurry standing time prior to centrifugation. To demonstrate the effect of each of these factors an experiment was conducted wherein wheat tempered to about 16–17% moisture was milled and a number of 50 gram samples of the particles were admixed with either 250 ml water (1:5 ratio) or 500 ml water (1:10 ratio) and agitated for one minute in a Waring blender at speeds of 10,000 rpm, 12,500 rpm, 15,000 rpm and 20,000 rpm to form a dispersed slurry. Following bran-germ removal, e.g., on screens, the slurry was centrifuged at 75G for 10 minutes. In some cases, the slurry was permitted to rest for periods of 5, 15 or 20 minutes prior to centrifugation to ascertain the effect of settling on phase separation in the centrifuge. The results are shown in Table I

TABLE I

| Sample No. | Blending RPM | Settling Time (Min.) | Flour:Water (Ratio) | Comments |
|---|---|---|---|---|
| 1 | 10,000 | 0 | 1:5 | Good separation |
| 2 | 10,000 | 5 | 1:5 | Poor separation |
| 3 | 10,000 | 15 | 1:5 | Poor separation |
| 4 | 10,000 | 20 | 1:5 | Poor separation |
| 5 | 10,000 | 0 | 1:10 | Good separation |
| 6 | 10,000 | 5 | 1:10 | Good separation |
| 7 | 10,000 | 15 | 1:10 | Good separation |
| 8 | 10,000 | 20 | 1:10 | Good separation |
| 9 | 12,500 | 0 | 1:5 | Good separation |
| 10 | 12,500 | 5 | 1:5 | Poor separation |
| 11 | 12,500 | 15 | 1:5 | Poor separation |
| 12 | 12,500 | 20 | 1:5 | Poor separation |
| 13 | 12,500 | 0 | 1:10 | Good separation |
| 14 | 12,500 | 5 | 1:10 | Good separation |
| 15 | 12,500 | 15 | 1:10 | Good separation |
| 16 | 12,500 | 20 | 1:10 | Poor separation |
| 17 | 15,000 | 0 | 1:5 | Good separation |
| 18 | 15,000 | 5 | 1:5 | Poor separation |
| 19 | 15,000 | 15 | 1:5 | Poor separation |
| 20 | 15,000 | 20 | 1:5 | Poor separation |
| 21 | 15,000 | 0 | 1:10 | Good separation |
| 22 | 15,000 | 5 | 1:10 | Good separation |
| 23 | 15,000 | 15 | 1:10 | Good separation |
| 24 | 15,000 | 20 | 1:10 | Good separation |
| 25 | 20,000 | 0 | 1:5 | Good separation |
| 26 | 20,000 | 5 | 1:5 | Good separation |
| 27 | 20,000 | 15 | 1:5 | Poor separation |
| 28 | 20,000 | 20 | 1:5 | Poor separation |
| 29 | 20,000 | 0 | 1:10 | Good separation |
| 30 | 20,000 | 5 | 1:10 | Good separation |
| 31 | 20,000 | 15 | 1:10 | Average separation |
| 32 | 20,000 | 20 | 1:10 | Average separation |

Within the limits of experimental error and subjective evaluation, it appears that at a dilution of 1:10 the phase separation following centrifugation is good irrespective of blender speed within the range 10,000–20,000 rpm, even where the slurry was permitted to stand for up to 20 minutes before centrifugation. When the dilution is only 1:5, good phase separation is achieved at any speed in the 10,000–20,000 rpm range if centrifugation is carried out without delay. However, if the slurry is allowed to stand around so that settling can commence, i.e., the extent of dissociation and dispersion is reduced, poor separation results at just about all blending speeds in the 10,000 to 20,000 rpm range. Other observations, which may not be completely evident from Table I, are that at any dilution, increased blending speed improves phase separation and increased standing time encourages incomplete separation.

It is noteworthy that during centrifugation the gluten protein agglomerates without incorporating starch particles in the agglomerate although any bran-germ which has not been previously separated will normally be incorporated in the protein agglomerate. The agglomerated protein defines the proteinaceous phase. Thus, in a single step, the protein is agglomerated and substantially completely separated from the starch, and this is accomplished without devitalizing or denaturing the protein in any respect and without requiring the starch to be washed from a thick, hydrated glutenstarch dough as in the only prior art known to accomplish comparable complete gluten-starch separation. It is the extent or degree of gluten-starch separation attainable by the application of centrifugal forces to the relatively thin slurry which primarily characterizes the instant porcess and distinguishes it from other processes which seemingly, but not in fact, accomplish the same result. For example, U.S. Pat. Nos. 3,501,451-Fellers and 3,542,754-Fellers teach proteinstarch separation from wheat flour-water slurries by using edible gluten modifying agents to assist in the separation. However, the extent of starch-gluten separation achieved by the centrifugation in these processes does not even approach the separation achieved by the instant process. Moreover, these processes do not recover the gluten component from the 20–40% gluten containing proteinaceous fraction and, therefore, do not purport to produce a highly vital gluten component having, for example 75–80% protein by weight on a dry basis. U.S. Pat. No. 3,951,938-Kerkkonen et al, previously discussed, discloses fundamentally the same process as in the aforementioned Fellers patents except that Kerkkonen et al takes the process a step further and treats the protein fraction to recover therefrom a higher purity gluten than in the Fellers' processes. Nevertheless, by comparison with the present invention, the process taught in U.S. Pat. No. 3,951,938 is inefficient in achieving starch-gluten separation and this is evidenced by the direct comparison between the two processes set forth in the following Example I.

EXAMPLE 1

To demonstrate the importance of dilution on starch-gluten separation, a number of wheat flour-distilled water slurries were formed having flour to water ratios, by weight, of 1:1.5, 1:2, 1:3 and 1:5. Wheat flour, rather than the whole wheat kernel, was used for this comparison to eliminate any possible influence or bran/germ, and to reduce the number of variables in order to focus on the effect of dilution. The slurries were mixed throughly in a Waring Commercial Blender at 13,500 rpm for one minute. The resulting homogenized slurries were poured into 250 ml centrifuge bottles, allowed to rest for 5 minutes, and centrifuged at 75G for 10 minutes. The resulting phase separation appeared to differ in degree for each slurry dilution (see Table II).

TABLE II

| Dilution Ratio | Flour (g) | Water (ml) | Phase Separation |
|---|---|---|---|
| 1:1.5 | 400 | 600 | Not clean |
| 1:2 | 333.3 | 666.6 | Not clean;better than 1:1.5 |
| 1:3 | 250 | 750 | Relatively good, but not sharp |
| 1:5 | 166.6 | 833.3 | Good |

In each case, an effort was made to cleanly separate and recover the supernatant protein phase or layer from the other phases. This separation was far easier where the centrifugation resulted in good phase separation. The separated protein phase (hereinafter "PP") was spread on aluminum foil and placed in a 55° C. oven overnight to dry. The dried material was weighed (Table III, Column I), ground through a 30 mesh screen and mixed well prior to analysis of the dried PP sample for water content (Table III, Column II) and nitrogen, from which % protein content as N × 5.7 (Table III, Column III) and protein content of the sample (Table III, Column IV) was calculated. The yield of protein in the PP sample based on the protein in the starting material flour was calculated and is shown in Table III, Column VII. The starting material flour was shown by analysis to contain 12.88%, by weight, water and 12.29%, by weight, protein. From this analysis and the flour weight in each sample from Table II it was possible to calculate the grams of starting flour present on a dry basis (Table III, Column V) and the protein content in the starting flour (Table III, Column VI).

TABLE III

| Sample Dilution Ratio | (I) PP (grams,db) | (II) PP % H$_2$O | (III) PP % Protein | IV=(I)×(III) PP Protein (grams,db) |
|---|---|---|---|---|
| 1:1.5 | 9.92 | 7.32 | 40.47 | 4.01 |
| 1:2 | 11.49 | 6.55 | 48.88 | 5.62 |
| 1:3 | 26.47 | 9.67 | 43.33 | 11.47 |
| 1:5 | 44.90 | 5.48 | 34.16 | 15.34 |

| Sample Dilution Ratio | (V) Starting Flour (grams,db) | (VI)=12.29%(V) Starting Flour Protein (grams,db) | (VII)=IV/VI % Yield Protein |
|---|---|---|---|
| 1:1.5 | 348.48 | 42.83 | 9.36 |
| 1:2 | 290.40 | 35.69 | 15.75 |
| 1:3 | 217.80 | 26.77 | 42.85 |
| 1:5 | 145.20 | 17.84 | 85.99 |

It is clear from Table III, Column VII that the yield of protein recovered is a function of the dilution of the wheat-water slurry. The yield at wheat:water ratios less than 1:3 is relatively small and is not sufficient to be commercially meaningful. At a wheat:water ratio of 1:3 the yield is almost 43% and is significant. At a wheat:water ratio of 1:5 the yield is quite high, about 86%. As a consequence, wheat:water ratios less than about 1:3 are not considered to be sufficiently efficient to form a part of the present invention.

The starch and protein phases which have been separated by the application of centrifugal forces to the slurry are independently recovered in conventional manner and are thereafter suitably purified in a manner to be described.

One common technique for phase recovery is to permit the heavier starch phase to filter through appropriately located small apertures in the centrifugal equipment while the lighter protein phase is recovered by gravity techniques. However, it should be appreciated that the particular technique used to independently recover the phases is not critical so long as the phase separation which has been created during centrifugation is maintained. The starch phase is purified by conventional techniques well known to the art and which form no part of the present invention.

The protein phase following separation from the starch phase includes any bran-germ not previously separated by screening as well as very small amounts of starch. Final purification of this protein phase is preferably achieved by subjecting the agglomerated gluten to treatment in a gluten washer wherein mechanical manipulation of the gluten mass is combined with water washing to separate any brangerm components in the mass and to wash away any residual starch. The kind and extent of mechanical manipulation employed is largely dependent upon the particular piece of equipment employed and exemplary devices suitable for use will be described herein. The wash water employed must be at a temperature below that at which the gluten will be damaged, i.e., always below about 140° F. and usually below 120° F., and is usefully in the range 60-90° F.

One gluten washer which has been shown to be very advantageous for use herein is disclosed in U.S. Pat. No. 3,981,738, the disclosure of which is hereby incorporated by reference. In its most fundamental form this device includes a foraminous elongated stator or housing of expanded metal in which is mounted for rotation a cylindrical shaft having a small diameter at one end and incrementally increasing in diameter toward its other end. Helical flights are set in a spiral configuration around and protruding outwardly from the cylindrical shaft. The outer surface of the cylindrical shaft comprises a plurality of peaked, elbow-shaped ridges. As the gluten mass is advanced along and though the stator or housing by rotation of the helical flights the surface of the gluten is scraped or picked at, i.e., abraded, by the peaked ridges and the foraminous stator surface. This loosens particles of bran-germ and exposes the starch in the interior of the gluten mass to wash water in which the shaft is submerged or which is sprayed onto the shaft. The bran-germ and starch are forced through the stator openings and are collected for subsequent separation and further component purification by conventional techniques.

In another suitable device for gluten washing, although not necessarily as effective in separating brangerm from gluten as the device of U.S. Pat. No. 3,981,738, the gluten mass is mechanically manipulated by continuous cutting and shredding, lifting and stretching to thoroughly expose it to a countercurrent flow of wash water having a temperature preferably in the range 60°-90° F. In one form of gluten washer, a continuous spiral ribbon conveyor operates concentrically in a perforated trough to simultaneously cut, shred and transport the gluten mass along the length of the trough. The conveyor is supported from a concentric shaft which also includes radially extending, generally triangular, paddles to scrape the gluten from the sides of the trough and to lift and move it from one side of the trough to the other. The paddles also stretch the gluten as it is conveyed through the trough to efficiently expose it to the wash water. The starch is washed through the perforations into a holding tank for subsequent further purification and drying by conventional techniques well known in the art. The purified gluten can then be recovered from the trough and dried. Exemplary of the numerous suitable drying techniques are vaccum tray drying, flash drying, spray drying and extrusion drying.

It will be appreciated that numerous other suitable gluten washing devices may be commercially available to accomplish the desired result of final gluten purification, particularly where the bran-germ particles have been substantially completely removed earlier in the process. For example, one very simple gluten washer is one or more vibrating screens wherein the gluten mass is washed on the screens to separate the small amount of residual starch therefrom. Depending on the equipment to be used for washing the gluten-containing protein phase it may be desirable following centrifugal phase separation to allow the glutencontaining phase to rest for 5-10 minutes to assist its agglomeration.

The following Example II illustrates the practice of the present invention.

EXAMPLE II

A predetermined amount of whole wheat kernels were tempered in water at a temperature of 68° F. for about 8 hours until the moisture content of the wheat was about 16–17% by weight. The tempered wheat was milled using a roller mill to flake the kernels and a hammer mill to disintegrate the flakes to a particular size distribution whereby about 50% of the particles are retained on a 50 mesh screen. The resulting particles were admixed with five times their weight of water (wheat to water ratio = 1:5) in a Waring blender. The admixture was blended vigorously for 1 minute at 20,000 rpm to form a homogeneous dispersion or slurry and the dispersion was screened through sequentially arranged 30 and 20 mesh screens to remove most of the bran-germ. The slurry was centrifuged at 75G for 10 minutes. A very clear three phase separation was effected with the lighter gluten phase separated by a water phase from the heavier starch phase. The gluten phase was recovered and washed with running water. The purified gluten was dried at 70° C. in a vacuum drier overnight. The starch phase was recovered, washed with water and air dried. The bran-germ separated on the screens was washed with water, pressed and air dried. The analysis of the fractionated components in percent by weight is as follows:

| Vital gluten | |
|---|---|
| Protein | 81.2% |
| Moisture | 5.5% |
| Ash | 1.0% |
| Fiber | 0.7% |
| Fat (E.E.)* | 0.75% |
| Fat (A.H.)** | 0.80% |
| Non-protein material | balance |
| Starch | |
| Protein | 0.2% |
| Moisture | 10.0% |
| Ash | 0.17% |
| Fat (E.E.)* | 0.14% |
| Pentosan | 0.90% |
| Starch | balance |
| Bran/Germ | |
| Protein | 17.5% |
| Moisture | 6.0% |
| Ash | 4.0% |
| Fiber (neutral detergent) | 59.6% (11.6% crude) |
| Fat (E.E.)* | 13.5% |
| Pentosans | 25.6% |
| Carbohydrate | balance |

*Fat determination by ether extraction
**Fat determination by acid hydrolysis

While the present invention has been described with reference to particular embodiments thereof, it will be understood that numerous modifications may be made by those skilled in the art without actually departing from the scope of the invention. Accordingly, all modifications and equivalents may be resorted to which fall within the scope of the invention as claimed.

What is claimed is:

1. A process for fractionating the whole wheat kernel to separate at least starch and gluten and to recover at least vital wheat gluten therefrom, comprising the steps of:
   a. tempering whole wheat kernels in water to a moisture content, by weight, in the range from 14% to saturation;
   b. milling the tempered kernels to particulate form;
   c. admixing said kernel particles with water and agitating said mixture to form a substantially homogeneous slurry in which said starch and gluten particles are dispersed, said slurry having a wheat to water ratio, by weight, of 1 part wheat to 3 or more parts water;
   d. subjecting said slurry to centrifugal forces sufficient to cause said slurry to separate into a primarily starch-containing phase, a supernatant, primarily gluten-containing phase and a primarily water phase, said gluten-containing phase containing agglomerated gluten;
   e. separating said supernatant agglomerated gluten-containing phase from said other phases; and
   f. recovering vital wheat gluten from said agglomerated gluten-containing phase.

2. A process, as claimed in claim 1, further including the step of recovering starch from said starch-containing phase.

3. A process, as claimed in claim 1, wherein said wheat kernels are tempered to a moisture content of from 14 to 22% by weight.

4. A process, as claimed in claim 1, wherein said wheat kernels are tempered to a moisture content of from 14 to 18% by weight.

5. A process, as claimed in claim 1, wherein said slurry has a wheat to water ratio in the range 1:3 to 1:10.

6. A process as claimed in claim 5, wherein said slurry has a wheat to water ratio of about 1:5.

7. A process, as claimed in claim 1, wherein said slurry is subjected to centrifugal forces in the range of 25G to 75G.

8. A process, as claimed in claim 1, wherein said supernatant glutencontaining phase is separated from said starch-containing phase by said water phase.

9. A process, as claimed in claim 1, wherein said gluten in said gluten-containing phase is caused to agglomerate during centrifugation.

10. A process, as claimed in claim 1, wherein vital wheat gluten is recovered from said agglomerated gluten-containing phase by mechanically manipulating said agglomerate while washing said agglomerate with water to wash non-gluten components of said agglomerate away fron said gluten.

11. A process, as claimed in claim 10, wherein said non-gluten components of said agglomerate include starch and bran-germ.

12. A process, as claimed in claim 11, wherein said bran-germ remaining in said agglomerate following washing is separated therefrom by abrading the agglomerate with a roughened surface.

13. A process, as claimed in claim 1, including the additional step of drying the gluten after recovery from said gluten-containing phase.

14. A process, as claimed in claim 1, including the step of separating bran-germ particles from said slurry prior to subjecting said slurry to centrifugal forces.

15. A process, as claimed in claim 14, wherein said bran-germ particles are separated from said slurry by filtering said slurry, said bran-germ particles being retained on said filter.

16. A process, as claimed in claim 14, including the step of recovering said separated bran-germ particles.

17. A process for fractionating the whole wheat kernel into its components to recover starch, gluten and bran-germ, comprising the steps of:
   a. tempering whole wheat kernels in water having a temperature in the range from about room temperature to 120° F. to a moisture content, by weight, in the range from 14 to 22%;
   b. milling the tempered kernels to particulate form;
   c. admixing said kernel particles with water and agitating said mixture to form a substantially homogeneous slurry in which said starch and gluten particles are dispersed, said slurry having a wheat to water ratio, by weight, in the range 1:3 to 1:10;
   d. subjecting said slurry to centrifugal forces in the range 25G to 75G to cause said slurry to separate into three phase, a primarily starch-containing phase, a primarily gluten-containing phase containing agglomerated gluten, and a primarily water phase;
   e. separating said gluten-containing and starch-containing phases;
   f. recovering vital wheat gluten from said gluten-containing phase by mechanically manipulating said agglomerate while washing said agglomerate with water having a temperature in the range 60 to 120° F. to wash bran-germ and starch away from said gluten, said mechanical manipulating including abrading the agglomerate with a roughened surface to separate said bran-germ therefrom;
   g. drying said gluten;
   h. recovering starch from said starch-containing phase; and
   i. recovering bran-germ from said gluten agglomerate wash water.

* * * * *